United States Patent [19]

Komoda et al.

[11] Patent Number: 4,769,678
[45] Date of Patent: Sep. 6, 1988

[54] PHOTOGRAPH PRINTING APPARATUS

[75] Inventors: Toshio Komoda; Tatsuo Iizuka, both of Saitama; Yoshimi Suganuma; Katumi Yamamoto, both of Tokyo, all of Japan

[73] Assignee: Fuji Photo Film Co., Ltd., Kanagawa, Japan

[21] Appl. No.: 108,399

[22] Filed: Oct. 14, 1987

[30] Foreign Application Priority Data

Oct. 14, 1986 [JP] Japan .................................. 61-243661
Oct. 14, 1986 [JP] Japan .................................. 61-243662

[51] Int. Cl.4 .................... G03B 27/32; G03B 27/52
[52] U.S. Cl. ........................................ 355/39; 352/90; 354/109; 355/40; 355/72
[58] Field of Search ................ 355/40, 39, 43, 54, 355/72, 46; 354/108, 109; 352/46, 70, 90, 97, 236

[56] References Cited

U.S. PATENT DOCUMENTS

| | | | |
|---|---|---|---|
| 1,564,291 | 12/1925 | Stanford | 355/39 X |
| 1,907,253 | 5/1933 | Debrie | 355/39 |
| 3,289,530 | 12/1966 | Samain | 355/40 X |
| 3,801,201 | 4/1974 | Greenblatt | 355/40 |
| 4,025,932 | 5/1977 | Miyagawa | 354/109 |
| 4,245,906 | 1/1981 | Froehlich | 355/43 |
| 4,252,436 | 2/1981 | Kogane | 355/75 |
| 4,469,438 | 9/1984 | Itikawa | 355/74 |
| 4,666,271 | 5/1987 | Gonsot | 355/39 X |

Primary Examiner—Richard A. Wintercorn
Attorney, Agent, or Firm—Sughrue, Mion, Zinn, Macpeak & Seas

[57] ABSTRACT

A photograph printing apparatus arranged to print a main picture and an illustration picture in a single frame on printing paper. The apparatus has a main picture negative film mount for carrying a negative film having the main picture and an illustration negative film mount for carrying a negative film having the illustration picture. The former film mount and the latter film mount are arranged to interlockingly move in the same direction to alternatively travel toward and away from the optical axis of exposure light. This arrangement enables rapid printing of photographs.

17 Claims, 6 Drawing Sheets

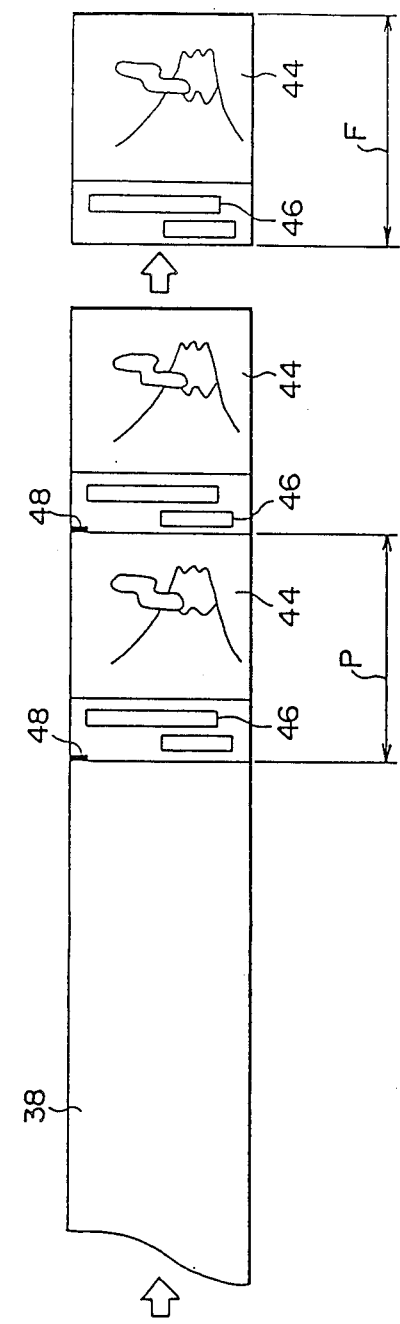
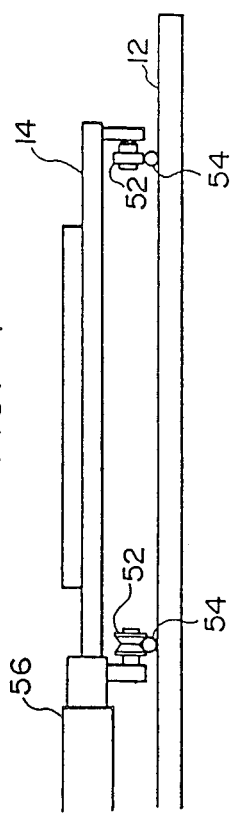

PHOTOGRAPH PRINTING APPARATUS

BACKGROUND OF THE INVENTION

1. Field of the Invention

The present invention relates to a photograph printing apparatus capable of printing two kinds of pictures in a single frame on printing paper.

2. Description of the Related Art

When a picture on a negative film is to be printed on printing paper, it may become necessary to print two kinds of pictures in a single frame on the printing paper. For example, in a case where a photograph is printed on a postcard-like sheet of printing paper, a picture such as a person, a building or a landscape is printed as a main picture, and an illustration picture such as characters, an illustration or a computer graphic (CG) is printed adjacent to the main picture or in such a manner as to overlap the same.

In this case, it is necessary to separately print the main picture and the illustration picture. Therefore, a main picture negative film having the main picture and an illustration negative film having the illustration picture are separately loaded into two film mounts, and these film mounts must be alternately changed to effect printing. Accordingly, such a conventional photograph printing method is unsuitable for printing a photograph on the postcard-like sheet of printing paper since it is necessary to print a plurality of photographs from the same frame of a negative film. Also, each time the film mounts are changed, an operator must readjust the exposure value of each negative film, and this requires complicated control of the exposure value.

SUMMARY OF THE INVENTION

It is therefore an object of the present invention to provide a photograph printing apparatus which is capable of printing two kinds of picture in the same frame on printing paper in spite of its simple structure.

It is another object of the present invention to provide a photograph printing apparatus in which exposure values can be easily controlled when the aforesaid printing is performed.

To these ends, the present invention provides a photograph printing apparatus arranged to print a main picture and an illustration picture in a single frame on printing paper, comprising a first negative film mount arranged to carry a first negative film having the main picture; movement means for causing the first negative film mount to move toward and away from the optical axis of exposure light; and a second negative film mount arranged to carry a second negative film having the illustration picture and disposed at a predetermined position in the direction of movement of the first negative film mount such that the second negative film mount is capable of moving forward and backward in the aforesaid direction of movement, the first negative film mount and the second negative film mount being arranged to selectively move toward and away from the optical axis of the exposure light.

Therefore, in accordance with the present invention, the first negative film mount and the second negative film amount may alternatively be located on the optical axis of the exposure light to align each of the first and second negative film mounts to that optical axis once, thereby effecting printing on a desired frame on printing paper. This arrangement enables a continuous print operation.

As an example, the first negative film mount and the second negative film mount may be disposed on the same movable table in such a manner that these mounts are interlockingly moved. In this case, two different pictures can be printed on the same frame merely by reciprocating the movable table once. This enables rapid printing of photographs.

A feature of the present invention resides in a photograph printing apparatus further including control means for controlling the exposure value of the second negative film on the basis of an exposure-value set signal representative of preset exposure conditions for the second negative film when the second negative film is positioned on the optical axis of the exposure light. In accordance with the feature of the invention, the exposure value of the second negative film is extremely easily controlled since its exposure conditions are previously set.

The foregoing and other objects, features, and advantages of the present invention will be made clearer from the following more particular description of a preferred embodiment referring to the accompanying drawings.

BRIEF DESCRIPTION OF THE DRAWINGS

FIG. 3 is a schematic illustration of pictures which are formed on printing paper by the preferred embodiment;

FIG. 4 is a diagrammatic, fragmentary side elevation taken in the direction of an arrow IV of FIG. 1;

DESCRIPTION OF THE PREFERRED EMBODIMENT

A preferred embodiment of the present invention will be described below with reference to the accompanying drawings.

Figure 2:
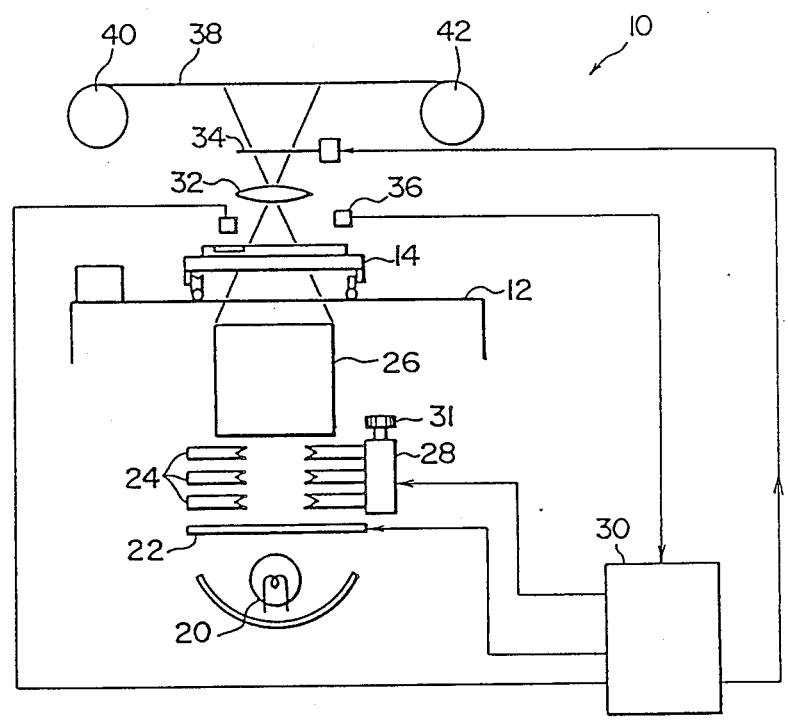
FIG. 2 is a schematic illustration of a preferred embodiment of the photograph printing apparatus of the present invention.

FIG. 2 diagrammatically shows the whole of a photograph printing apparatus to which the present invention is applied. A photograph printing apparatus indicated generally at 10 includes a base 12 which carries a movable table 14.

Figure 1:
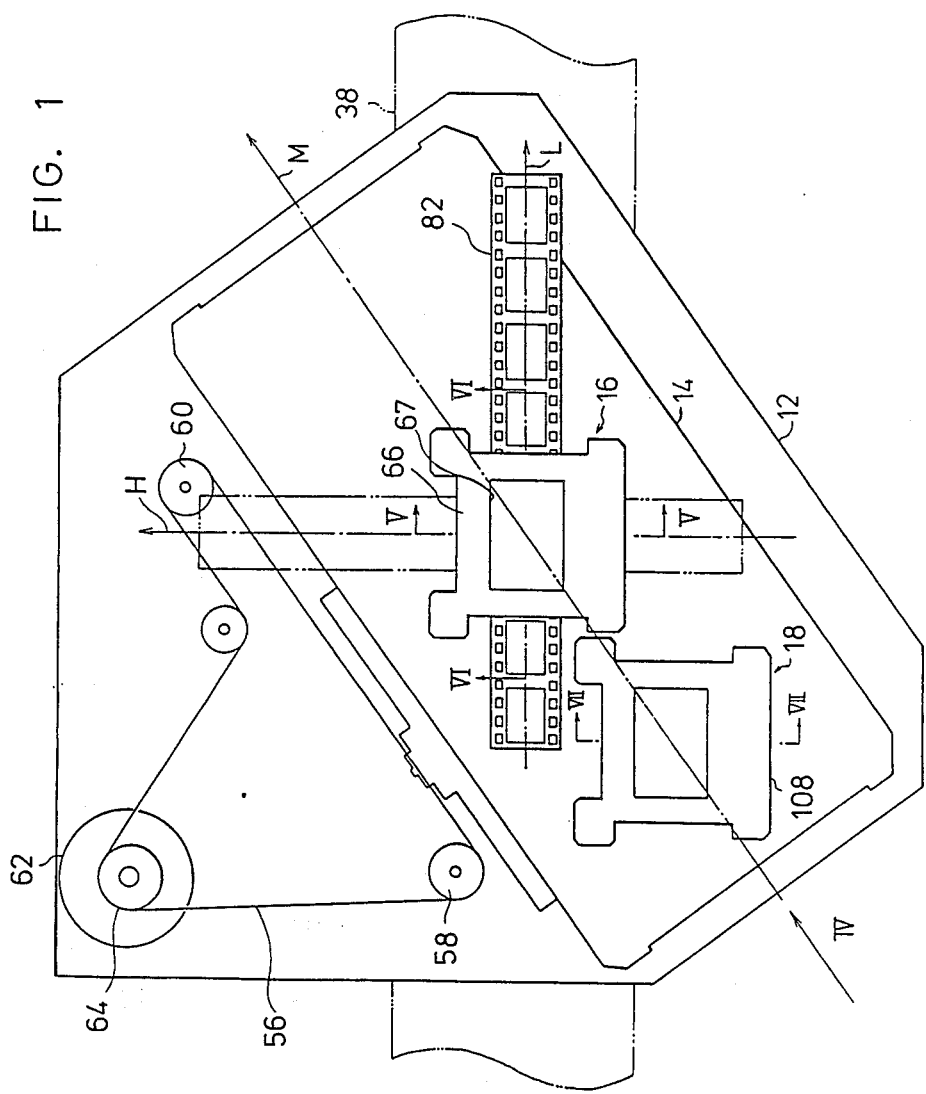
FIG. 1 is a diagrammatic plan view of a movable table for use in a pnotograph printing apparatus to which the present invention is applied.

As shown in FIG. 1, a main negative film mount 16 and an illustration negative film mount 18 are adapted to be alternately located on the optical axis of exposure light.

A lamp 20, a neutral filter 22, CC filters (color compensation filters) 24, and a light diffusion tube 26 are disposed under the base 12, and the exposure light emanating from the lamp 20 passes through these components 22, 24 and 26 toward a negative film carried on the movable table 14. The neutral filter 22 and the CC filters 24 capable of continuously varying cyan, yellow and magenta are controlled by a drive unit 28. The CC filters 24 are composed of a combination of three filters for compensating for cyan, yellow and magenta, and the drive unit 28 is adapted to operate in response to a command issued by a control unit 30.

The drive unit 28 for driving the CC filters 24 can also be operated through a manual dial 31 instead of a command of the control unit 28.

A lens 32 and a shutter 34 are disposed above the base 12, and the shutter 34 is adapted to control its exposure time and timing in response to a command issued by the control unit 30.

A sensor 36, which is disposed above the base 12, is arranged to detect the density of a negative film and supply the thus-obtained detection signal to the control unit 30 so as to determine an exposure value corresponding to that density.

When the shutter 34 is opened, the exposure light illuminates printing paper 38 which is disposed above the shutter 34, thereby performing exposure. The printing paper 38 which is rolled up is loaded as a roll 40 on a supply side. After exposure, the printing paper 38 is took up as a roll 42 on a take-up side.

FIG. 3 illustrates the printing paper 38 including picture frames printed by the present apparatus. Each printed picture frame P includes a main picture 44 and an illustration picture 46. After printing, the printing paper 38 is cut into photographic prints F each having the printed picture frame P.

As shown in FIGS. 2 and 4, a plurality of rollers 52 are rotatably supported on the movable table 14, and a pair of guide rails 54 are disposed on the base 12. The movable table 14 is capable of moving in the direction indicated by an arrow M along guide rails 54 carried by the base 12. The movable table 14 is fixed to a portion of an endless timing belt 56. An intermediate portion of the endless timing belt 56 is linearly passed between pulleys 58 and 60 which are rotatably supported by vertical shafts disposed on the base 12, and a portion of this intermediate portion is attached to the movable table 14. Another portion of the endless timing belt 56 is passed around a pulley 64 which is rotatably fitted onto the output shaft of a motor 62. The movable table 14 is capable of being moved forward and backward on the base 12 by the forward and reverse rotation of the pulley 64.

Figure 5:
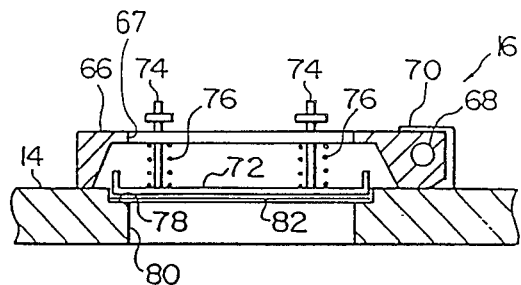
FIG. 5 is a diagrammatic, fragmentary cross section taken along the line V—V of FIG. 1.
Figure 6:
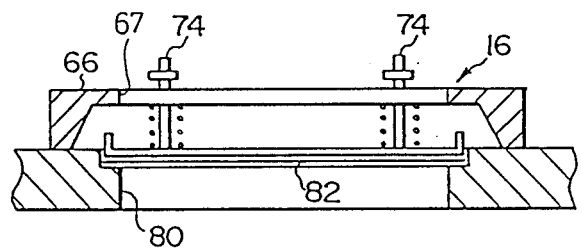
FIG. 6 is a diagrammatic, fragmentary cross section taken along the line VI—VI of FIG. 1.

As shown in FIG. 5, the main negative film mount 16 has a body 66 which is supported for pivotal movement about a pin 68 by a bracket 70 mounted on the movable table 14. A pressure plate 72 is disposed parallel to the body 66, and pins 74 fixed to the pressure plate 72 extend through the body 66. A compression coil spring 76 is fitted onto each of the portions of the pins 74 which are defined by the body 66 and the pressure plate 72.

A recess, which serves as a negative film guide 78, is formed in the surface of the movable table 14 which is adjacent to the pressure plate 72, and the negative film guide 78 communicates with an exposure aperture 80. A main picture negative film 82 is inserted into the negative film guide 78 in such a manner that the longitudinal axis of the film 82 is disposed parallel to the direction of an arrow L of FIG. 1 (a longitudinal direction). The inserted main picture negative film 82 is pressed against the bottom of the negative film guide 78 by the pressure plate 72 under the urging force of the compression coil springs 76. As required, when the body 66 is turned while lifted up from the movable table 14, the main picture negative film 82 can be slided in the direction of the arrow L.

As shown in FIG. 1, the body 66 has an exposure aperture 67 having a rectangular form in plan view.

It is preferred that a resilient member or the like be incorporated so that the body 66 may be maintained in the state illustrated in FIG. 5 and in a state of being moved upward from this state about the pin 68.

As shown in FIG. 1, the mount 66 supports the main picture negative film 82 on the movable table 14 in such a manner that the longitudinal axis of the film 82 is disposed parallel to the direction of the arrow L of FIG. 1 and the direction (a transverse direction) of an arrow H perpendicular to that direction. The axis of the main picture negative film 82 extending in the longitudinal direction L intersects an axis extending in the transverse direction H at right angles, and the intersection corresponds to the optical axis of exposure light. The movable table 14 is capable of moving at a predetermined angle between the longitudinal direction L and the transverse direction H.

Figure 7:
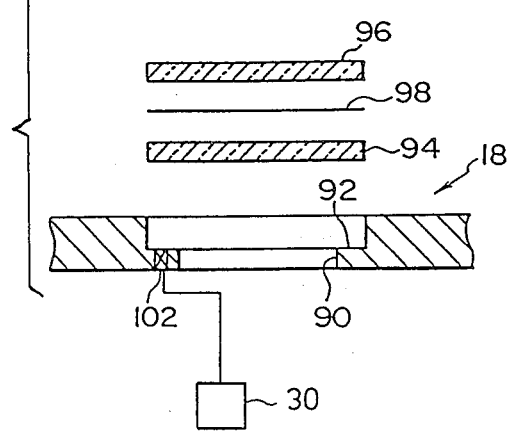
FIG. 7 is a diagrammatic, fragmentary cross section taken along the line VII—VII of FIG. 1.

As shown in FIG. 7, the illustration negative film mount 18 includes an exposure aperture 90 which is opened on the movable table 14, and the exposure aperture 90 is surrounded by a step 92 to form a receiving portion for receiving glass plates 94 and 96 in a superimposed manner. The illustration negative film 98 is sandwiched between the glass plates 94 and 96. The illustration negative film 98 has an illustration picture whose size corresponds to an area occupied by each of the illustration pictures 46 printed on the printing paper 36 shown in FIG. 3. Therefore, the frame of the main picture negative film 82 which is located in the main picture negative mount 82 is shifted from the illustration negative film 98 in the direction of the optical axis, thereby enabling compensation for a difference in the optical path length of the exposure light which is caused by the refractive indexes of the glass plates 94 and 96.

It is to be noted that, as shown in FIG. 3, marks or pictures may previously be provided on the illustration negative film 98 so as to form a cut mark 48 on a portion of each of the illustration pictures 46.

Figure 8:
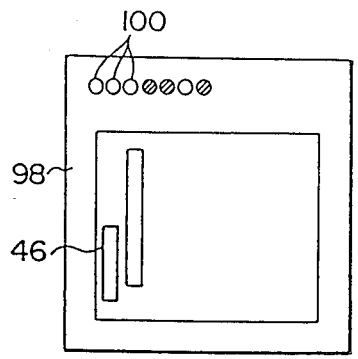
FIG. 8 is a plan view of one example of a frame of an illustration negative film used in the present invention.

As shown in FIG. 8, the illustration negative film 98 further includes an indicating area 100 which is disposed adjacent to each of the illustration pictures 46, and the optimum exposure conditions of the corresponding illustration picture 46 are recorded in the indicating area 100. The indicating area 100 includes a plurality of black dots coated on the illustration negative film 98. Some of the black dots are painted white or covered by pieces of white tape in order to record and represent a predetermined optimum exposure value of the illustration picture 46. The indicating area may also be formed by white dots some of which are made black.

A photoelectric sensor 102 is disposed in the above-described receiving portion for receiving the illustration negative film 98 on the movable plate 14 at a position thereof which corresponds to the indicating area 100. The photoelectric sensor 102 is arranged to transmit a detection signal, that is, an exposure value set signal to the control unit 30. When the control unit 30 receives the detection signal representative of information indicated by the indicating area 100, the control unit 30 is adapted to control the CC filters 24 and the shutter 34 prior to a detection signal supplied from the sensor 36. However, if the indicating area 100 has no information, a required exposure value is determined on the basis of a detection signal supplied from the sensor 36. Alternatively, the CC filters 24 and the shutter 34 may be controlled by means of the manual dial 29 provided on the drive unit 28. In this case, the timing of opening and closing the shutter 34 is preset.

It is to be noted that a body 108 (FIG. 1) similar to the body 66 of the main picture negative film mount 16 is preferably provided on the illustration negative film mount 18 so as to press the glass plates 94 and 96 against the step 92.

The following is a description of the operation of the present invention.

The main picture negative film 82 having a picture from which a main picture 44 is formed is loaded into the main negative film mount 16. This loading operation is performed by lifting up the body 66, inserting the main picture negative film 82 into the negative film guide 82 in the direction of the arrow L, and depressing the body 66 downward. Thus the main picture negative film 82 is pressed against the movable table 14 by the pressure plate 72 under the urging force of the compression coil springs 76.

The illustration negative film 98 sandwiched between the glass plates 94 and 96 is mounted on the step 92 of the illustration negative film mount 18.

Figure 10:
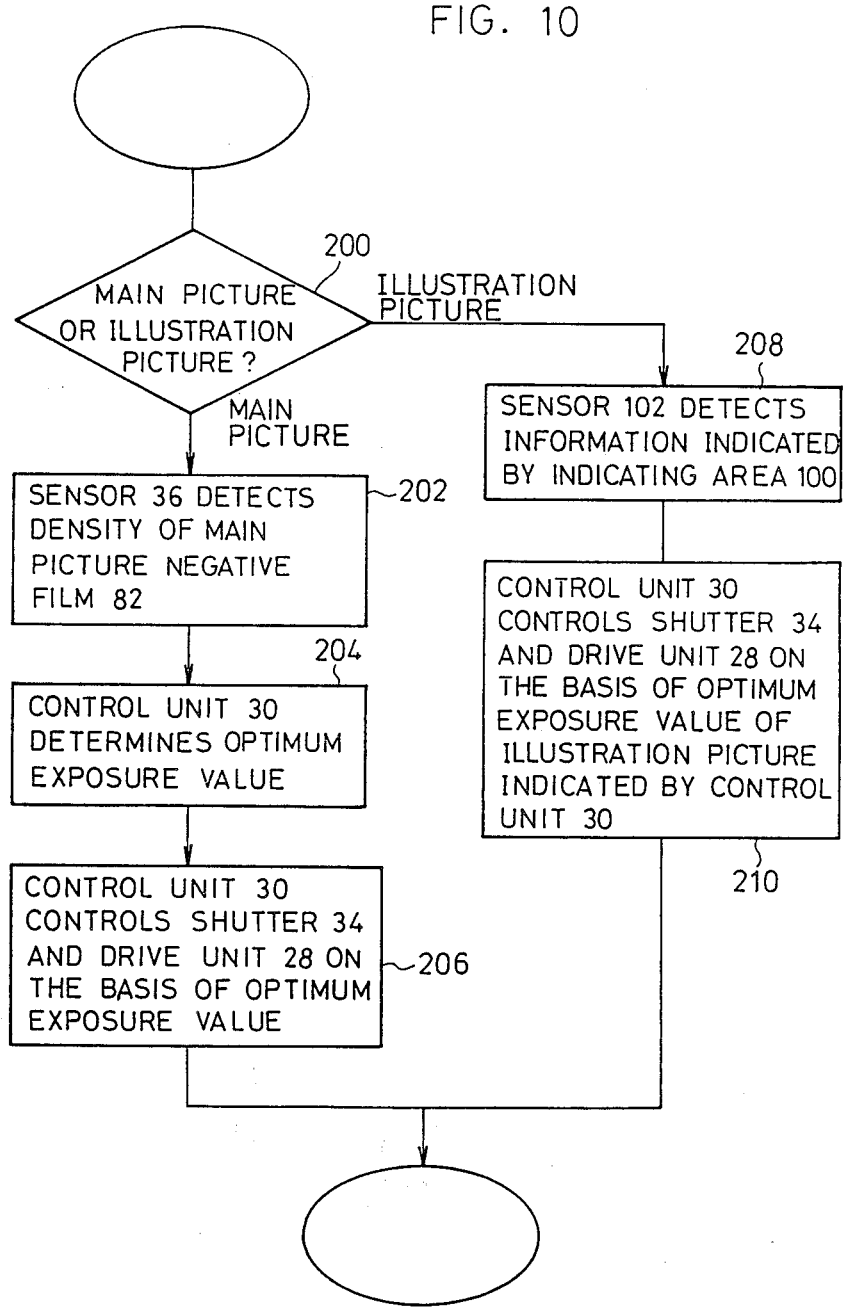
FIG. 10 is a flow chart of the operation of the preferred embodiment of the invention.

As shown in the flow chart of FIG. 10, a predetermined frame of the printing paper 38 is moved on the optical axis (Step 200), and the main picture 44 is projected on the predetermined frame in the state shown in FIG. 1. In this case, the density of the main picture negative film 82 which is measured through the sensor 36 (Step 202) is calculated by the control unit 30 to determine the optimum exposure value (Step 204). The drive unit 28 and the shutter 34 are driven in accordance this exposure value (Step 206).

When the projection of the main picture 44 is completed, the motor 62 drives the endless timing belt 56 to cause the movable table 14 to move in the direction of the arrow M, thereby retracting the main picture negative mount 16 from the optical axis and in turn disposing the illustration negative film mount 18 on that optical axis (Step 200). The sensor 102 detects information indicated by the indicating area 100 (Step 208), and the control unit 30 controls the drive unit 28 and the shutter 34 in accordance with the optimum exposure value of the illustration negative film 98 (Step 210). In this manner, a desired picture in the illustration negative film 98 is projected as the illustration picture 46 constituting part of the frame P and thus the frame P as a latent image is formed in the photosensitive surface of the printing paper 38.

After the printing paper has been moved a distance equivalent to one frame in the direction of the arrow L, the following frame is exposed in accordance with the same procedures as described above. In consequence, the frames P are continuously formed in the photosensitive surface of the printing paper 38. Each of the frames P is constituted by the main picture 44 and the illustration picture 46.

It may be desirable that the main picture 44 which is rotated through 90 degrees is projected onto a frame of the printing paper 38, depending upon the kind of the main picture negative film 82. In this case, the main picture negative film 82 is removed from the main negative film mount 16, rotated through 90 degrees, inserted into the negative film guide 78, and pressed by the pressure plate 72.

As described above, the present apparatus is convenient in that a piece of the main picture negative film 82 having four or six frames is loaded into the main negative film mount 16 without the need to cut the film 82 into the respective frames. Of course, if a support member for supporting a film roll is attached to the movable table 14, it is possible to employ a long negative film, and the present invention does not prevent use of a piece of a negative film cut so as to have only one frame and use of a piece of a negative film having a square.

It is to be noted that the indicating area 100 provided on the illustration negative film 98 is not limited to the above-described recording means employing a difference in reflectivity or color. For example, characters, magnetic recording means, electrical switching means or other recording means may be utilized, and detecting means may be selected in correspondence with the kind of recording means. Also, the indicating area 100 may be provided on the glass plate 94. In this case, a plurality of glass plates 94 having information corresponding to various exposure conditions may be prepared, and a desired one may be selected therefrom.

It is also to be noted that the form of the exposure aperture 67, 80 or 90 is rectangular in the above-described embodiment but it is not limited to such a form. For example, the exposure aperture can be formed in such a quadrilateral as a square.

Figure 9:
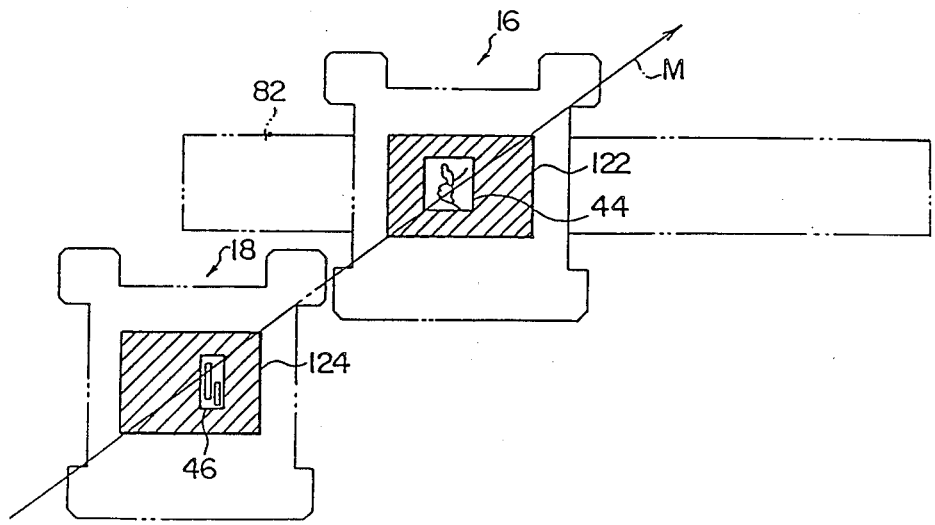
FIG. 9 is a diagrammatic plan view similar to FIG. 1, with portions omitted for the sake of simplicity, illustrating masks for covering a film in accordance with the present invention.

As shown in FIG. 9, the main negative film mount 16 and the illustration negative film mount 18 may respectively be covered by masks 122 and 124 except for the areas occupied by the main picture 44 and the illustration picture 46. The masks 122 and 124 are respectively painted black for light shielding purposes except for the portions corresponding to the main picture 44 and the illustration picture 46.

When these respective masks are to be attached to the main picture negative film mount 16 and the illustration negative film mount 18, the masks 122 and 124 may be stuck by adhesive tape to the bottom of the pressure plate 72 of FIG. 5 and the bottom of the glass plate 96 of FIG. 7, respectively. Alternatively, these masks may be stuck directly to the main picture negative film mount 82 and the illustration negative film mount 98.

What is claimed is:

1. A photograph printing apparatus arranged to print a main picture and an illustration picture in a single frame on printing paper, comprising:

a first negative film mount arranged to carry a first negative film having said mount picture;

movement means for causing said first negative film mount to move toward and away from the optical axis of exposure light; and a second negative film mount arranged to carry a second negative film having said illustration picture and disposed at a predetermined position in the direction of movement of said first negative film mount such that said second negative film mount is capable of moving forward and backward in said direction of movement, said first negative film mount and said second negative film mount being arranged to selectively move toward and away from said optical axis of said exposure light.

2. A photograph printing apparatus according to claim 1, wherein said first negative film mount and said second negative film mount are arranged to be alternately located on said optical axis of said exposure light in an interlocking relationship.

3. A photograph printing apparatus according to claim 2, wherein said movement means has a movable table provided with said first negative film mount and said second negative film mount, said first negative film mount and said second negative film mount being moved in said interlocking relationship by the movement of said movable table.

4. A photograph printing apparatus according to claim 3, wherein said movement means has guide means for guiding said movement of said movable table.

5. A photograph printing apparatus according to claim 1, further including control means for controlling the exposure value of said second negative film on the basis of a exposure-value set signal representative of preset exposure conditions for said second negative film when said second negative film is positioned on said optical axis of said exposure light.

6. A photograph printing apparatus according to claim 5, further including a sensor for detecting said exposure conditions to supply said exposure-value set signal to said control means.

7. A photograph printing apparatus according to claim 6, wherein said exposure conditions are indicated by an indicating area provided on said second negative film, said sensor being arranged to detect information indicated by said indicating area.

8. A photograph printing apparatus according to claim 3, wherein said first negative film mount and said second negative film mount each have a quadrilateral exposure aperture, said first negative film mount and said second negative film mount being disposed on said movable table such that a diagonal of said exposure aperture in said first negative film mount substantially corresponds to a diagonal of said exposure aperture in said second negative film mount.

9. A photograph printing apparatus according to Claix 8, wherein said movement means has guide means for enabling said movable table to move in the direction of said diagonal.

10. A photograph printing apparatus arranged to print two kinds of picture in a single frame on printing paper, one of said two kinds being a main picture on a main picture negative film and the other being an illustration picture on an illustration negative film, said main picture negative film and said illustration picture negative film each having first sides and second sides, said apparatus comprising:

a main picture negative film mount having a quadrilateral exposure aperture with first sides and second sides for carrying said main picture negative film in either of the directions in which the first sides of said main picture negative film are disposed parallel to said first sides of said exposure aperture and in which said first sides thereof are disposed parallel to said second sides of said exposure aperture;

movement means for moving said main picture negative film mount forward and backward in a direction intersecting said directions on the optical axis of exposure light to cause said main picture negative film mount to move toward away from said optical axis of said exposure light; and an illustration negative film mount having a quadrilateral exposure aperture with first sides and second sides and disposed at a predetermined position in the direction of movement of said main picture negative film mount for carrying said illustration negative film, said illustration negative film mount being capable of moving forward and backward in said direction of movement, said main picture negative film mount and said illustration negative film mount being arranged to selectively move toward and away from said optical axis of said exposure light.

11. A photograph printing apparatus according to claim 10, wherein said movement means includes a movable table provided with said main picture negative film mount and said illustration negative film mount which are moved integrally and in the same direction by the movement of said movable table.

12. A photograph printing apparatus according to claim 11, wherein said movement means has guide rails which defines the direction of movement of said movable table, said movable table being moved along said guide rails.

13. A photograph printing apparatus according to claim 12, wherein said movement means drive means for causing said movable table to move linearly and reciprocally to cause said main picture negative film mount and said illustration negative film mount to move toward and away from said optical axis of said exposure light.

14. A photograph printing apparatus according to claim 11, wherein said movement means has guide means arranged to cause said direction of movement of said movable table to correspond to each of said diagonals of said exposure apertures in said first negative film mount and in said second negative film mount.

15. A photograph printing apparatus according to claim 10, further including control means for controlling the exposure value of said illustration negative film on the basis of a exposure-value set signal representative of preset exposure conditions for said illustration negative film when said illustration negative film mount is positioned on said optical axis of said exposure light.

16. A photograph printing apparatus according to claim 15, further including a sensor for detecting said exposure conditions to supply said exposure-value set signal to said control means.

17. A photograph printing apparatus according to claim 16, wherein said exposure conditions are indicated by an indicating area provided on said illustration negative film, said sensor being arranged to detect information indicated by said indicating area.

* * * * *